US012078323B2

(12) United States Patent
Wang

(10) Patent No.: US 12,078,323 B2
(45) Date of Patent: Sep. 3, 2024

(54) NON-WELDED AND ANTI-DEFORMATION LAMP BASE AND NON-WELDED AND ANTI-DEFORMATION LIGHT BULB

(71) Applicant: DONGGUAN HUIHUAN LIGHTING CO., LTD, Dongguan (CN)

(72) Inventor: Song Wang, Chengdu (CN)

(73) Assignee: DONGGUAN HUIHUAN LIGHTING CO., LTD, Dongguan (CN)

( * ) Notice: Subject to any disclaimer, the term of this patent is extended or adjusted under 35 U.S.C. 154(b) by 0 days.

(21) Appl. No.: 18/501,996

(22) Filed: Nov. 4, 2023

(65) Prior Publication Data

US 2024/0068645 A1 Feb. 29, 2024

(30) Foreign Application Priority Data

Apr. 24, 2023 (CN) ......................... 202320936040.1

(51) Int. Cl.

| | |
|---|---|
| ***F21V 15/01*** | (2006.01) |
| ***F21K 9/23*** | (2016.01) |
| ***F21K 9/235*** | (2016.01) |
| ***F21K 9/238*** | (2016.01) |
| ***F21V 19/00*** | (2006.01) |
| ***F21V 19/06*** | (2006.01) |

(Continued)

(52) U.S. Cl.

CPC ............ *F21V 15/01* (2013.01); *F21V 19/006* (2013.01); *F21K 9/23* (2016.08); *F21K 9/235* (2016.08); *F21K 9/238* (2016.08); *F21V 19/0055* (2013.01); *F21V 19/0065* (2013.01); *F21V 19/007* (2013.01); *F21V 19/06* (2013.01); *H01R 33/02* (2013.01); *H01R 33/22* (2013.01); *H01R 33/225* (2013.01); *H01R 33/9453* (2013.01); *H01R 33/9555* (2013.01); *H01R 33/9651* (2013.01); *H01R 33/971* (2013.01); *H01R 33/9753* (2013.01)

(58) Field of Classification Search

CPC ..... F21K 9/23–238; F21V 19/006–007; F21V 19/0055; F21V 19/06; H01R 33/22; H01R 33/225; H01R 33/9453; H01R 33/9555; H01R 33/9651; H01R 33/971; H01R 33/9753

See application file for complete search history.

(56) References Cited

U.S. PATENT DOCUMENTS

2009/0045717 A1 2/2009 Cavallaro et al.
2009/0257236 A1 10/2009 Behr et al.

(Continued)

FOREIGN PATENT DOCUMENTS

WO WO-2013018242 A1 * 2/2013 ........... F21K 9/1355

OTHER PUBLICATIONS

Machine translation of WO 2013018242 A1 retrieved from the FIT database of PE2E search. (Year: 2024).*

*Primary Examiner* — Colin J Cattanach
(74) *Attorney, Agent, or Firm* — Zhigang Ma

(57) ABSTRACT

The present disclosure relates to the technical field of lamps, and discloses a non-welded and anti-deformation lamp base and a non-welded and anti-deformation light bulb. The lamp base of the present disclosure is integrally molded with the plastic insulating piece to replace a glass insulating piece of the traditional lamp base. The plastic insulating piece has both an environmental protection effect and an inward sinking deformation prevention effect, so that the quality of the light bulb is effectively improved.

8 Claims, 10 Drawing Sheets

(51) Int. Cl.

| | |
|---|---|
| ***H01R 33/02*** | (2006.01) |
| ***H01R 33/22*** | (2006.01) |
| ***H01R 33/945*** | (2006.01) |
| ***H01R 33/955*** | (2006.01) |
| ***H01R 33/965*** | (2006.01) |
| ***H01R 33/97*** | (2006.01) |
| ***H01R 33/975*** | (2006.01) |

(56) References Cited

U.S. PATENT DOCUMENTS

| | | | | |
|---|---|---|---|---|
| 2012/0127734 | A1* | 5/2012 | Tanimoto | F21K 9/65<br>362/363 |
| 2013/0221829 | A1* | 8/2013 | Kitagawa | F21V 3/00<br>359/793 |
| 2014/0049967 | A1* | 2/2014 | Zhou | F21K 9/23<br>362/287 |
| 2016/0018087 | A1* | 1/2016 | Gielen | F21V 17/10<br>29/876 |
| 2017/0254484 | A1* | 9/2017 | Frye | F21V 29/70 |
| 2018/0180269 | A1 | 6/2018 | Liu | |
| 2019/0257478 | A1* | 8/2019 | Wang | F21K 9/238 |

* cited by examiner

NON-WELDED AND ANTI-DEFORMATION LAMP BASE AND NON-WELDED AND ANTI-DEFORMATION LIGHT BULB

TECHNICAL FIELD

The present disclosure relates to the technical field of lamps, and in particular, to a non-welded and anti-deformation lamp base and a non-welded and anti-deformation light bulb.

BACKGROUND

A light bulb refers to a lighting source that emits light through electrical energy. It was invented by Henry Goebel in 1854, and Edison found a more suitable material to research and develop an incandescent lamp. With the development of the technology, incandescent lamps are gradually developed towards efficient and energy-saving light-emitting diode (LED) light bulbs. In an existing light bulb, when power is made to the light bulb, positive and negative electrodes can separately conduct current to avoid a short circuit in the light bulb. A tail end of a lamp base is usually coated with a glass insulating layer, and a top end of the glass insulating layer is welded with a tin layer. To assemble the light bulb, one electrode is electrically connected to a metal shell, and the other electrode is electrically connected to the tin layer, so that the two electrodes do not interfere with each other while the light bulb is electrified. However, in this technology, due to many heavy metal impurities, especially lead, contained in the glass insulating layer and a soldering flux, heavy metal pollution is easily caused in the production process, posing significant safety hazards to the environment and production personnel.

Chinese patent CN201120197587.1 discloses a non-welded spiral lamp base, including a spiral lamp base shell. The spiral lamp base shell is provided with an insulator, and a conductive rivet is arranged in the insulator. Although the glass insulating layer has been improved in the prior art, and a more environmentally-friendly non-welded lamp base has been proposed in the prior art, due to a thin bottom of the metal shell, the formed light bulb is in threaded connection with an external lamp holder. During mounting, when the light bulb is screwed to the bottom of the lamp holder to be in contact with a conductive end, a problem of inward sinking deformation of a bottom end face of the metal shell under a force is easily caused, resulting in poor electrical contact or short circuit. The quality of the light bulb still cannot be guaranteed. In view of this, the inventor has made a new invention.

SUMMARY

For the drawbacks of the prior art, the present disclosure aims to provide a non-welded and anti-deformation lamp base and a light bulb thereof, which have the characteristics of environmental friendliness and deformation resistance.

In order to achieve the above objective, the present disclosure provides a non-welded and anti-deformation lamp base, including a metal shell, an end plate, a plastic insulating piece, and a conductive rivet. The metal shell is provided with an external threaded portion, an accommodating cavity, an opening, a first annular side wall, and a second annular side wall. The external threaded portion is provided on an outer surface of the metal shell. The accommodating cavity is provided in an interior of the metal shell. The opening is formed at one end of the metal shell and communicates with the accommodating cavity. The first annular side wall is arranged on the other end of the metal shell and extends from one end of the external threaded portion. The second annular side wall is arranged in an internal space enclosed by the first annular side wall, where one end of the second annular side wall is connected to one end of the first annular side wall. The end plate is arranged at the other end of the metal shell, where the end plate is bent from the other end of the second annular side wall and extends towards a center axis of the internal space. The second annular side wall and the end plate cooperate to form, at an outer side of the end plate, an accommodating slot recessing inwards the interior of the metal shell. The plastic insulating piece is connected to the end plate and configured to prevent inward sinking deformation of the end plate; where the plastic insulating piece is located on the center line of the metal shell; the plastic insulating piece is provided with an assembling hole; the assembling hole communicates with the accommodating cavity. The conductive rivet is assembled in the assembling hole.

Further, a mounting hole is formed in a middle part of the end plate; the plastic insulating piece is arranged in the mounting hole; the plastic insulating piece includes an upper assembling portion and a lower assembling portion connected to each other; the upper assembling portion is arranged on an inner side of the end plate; the lower assembling portion is arranged on an outer side of the end plate and accommodated in the accommodating slot; and a first annular assembling slot configured to be connected to the end plate is arranged between the upper assembling portion and the lower assembling portion.

Further, both the upper assembling portion and the lower assembling portion fully cover an inner surface and an outer surface of the end plate.

Preferably, the second annular side wall abuts against the first annular side wall, or, a space is formed between the first annular side wall and the second annular side wall.

Further, a cross section of the lower assembling portion is semi-circular, and the assembling hole is arranged in a middle position of the lower assembling portion.

Preferably, the plastic insulating piece further includes a frustum portion; the frustum portion is connected to the lower assembling portion; and the assembling hole is arranged in a middle position of the frustum portion.

Preferably, the conductive rivet includes a rivet cap and a rivet body integrally arranged; a second annular assembling slot is arranged at an outer end of the assembling hole; an annular protrusion matched with the second annular assembling slot is arranged at a bottom of the rivet cap; or, an annular protrusion is arranged at an outer end of the assembling hole; and a second annular assembling slot matched with the annular protrusion is arranged at a bottom of the rivet cap.

Preferably, the assembling hole is a polygonal hole; the conductive rivet includes a rivet cap and a rivet body integrally arranged; the rivet body is polygonal; and the rivet body is matched with the assembling hole.

The present disclosure further provides a non-welded and anti-deformation light bulb. The light bulb includes a lamp base, a center column structure, and a bulb shell fixedly connected to the metal shell, wherein the center column structure includes a center column seat, and a first conductor wire, a luminescent lamp body, and a second conductor wire which are electrically connected to each other in sequence; the center column seat is arranged at a mouth portion of the bulb shell; the luminescent lamp body is arranged inside the bulb shell; one end of the first conductor wire and one end of the second conductor wire are respectively electrically connected to the luminescent lamp body through the center column seat; the other end of the first conductor wire is electrically connected to the metal shell; and the other end of the second conductor wire is electrically connected to the conductive rivet.

Beneficial effects are as follows: Compared with the prior art, the present disclosure discloses a non-welded and anti-deformation lamp base and a non-welded and anti-deformation light bulb. The non-welded and anti-deformation lamp base includes a metal shell; the non-welded and anti-deformation lamp base further includes a plastic insulating piece connected to the end plate and configured to prevent inward sinking deformation of the end plate; the plastic insulating piece is located on a center line of the metal shell; the plastic insulating piece is provided with an assembling hole; the assembling hole is communicated with the accommodating cavity; the non-welded and anti-deformation lamp base further includes a conductive rivet; and the conductive rivet is assembled in the assembling hole. The present disclosure has the following advantages: 1. The lamp base is integrally molded with the plastic insulating piece which replaces a glass insulating piece of the traditional lamp base, so that the lamp base has the advantages of environmental friendliness, low cost, and the like. 2. The upper assembling portion and the lower assembling portion arranged on the plastic insulating piece abut against the inner and outer sides of the end plate, and have an effect of preventing deformation of the end plate of the metal shell, to ensure the quality of the light bulb. 3. A top of the insulating piece is directly assembled with a metal conductor for electricity conduction, which replaces the manner for conduction by tin soldering of the traditional lamp base. The production process can be simplified, the purpose of environmental protection can be achieved, and green production of light bulbs is promoted.

Figure 1:
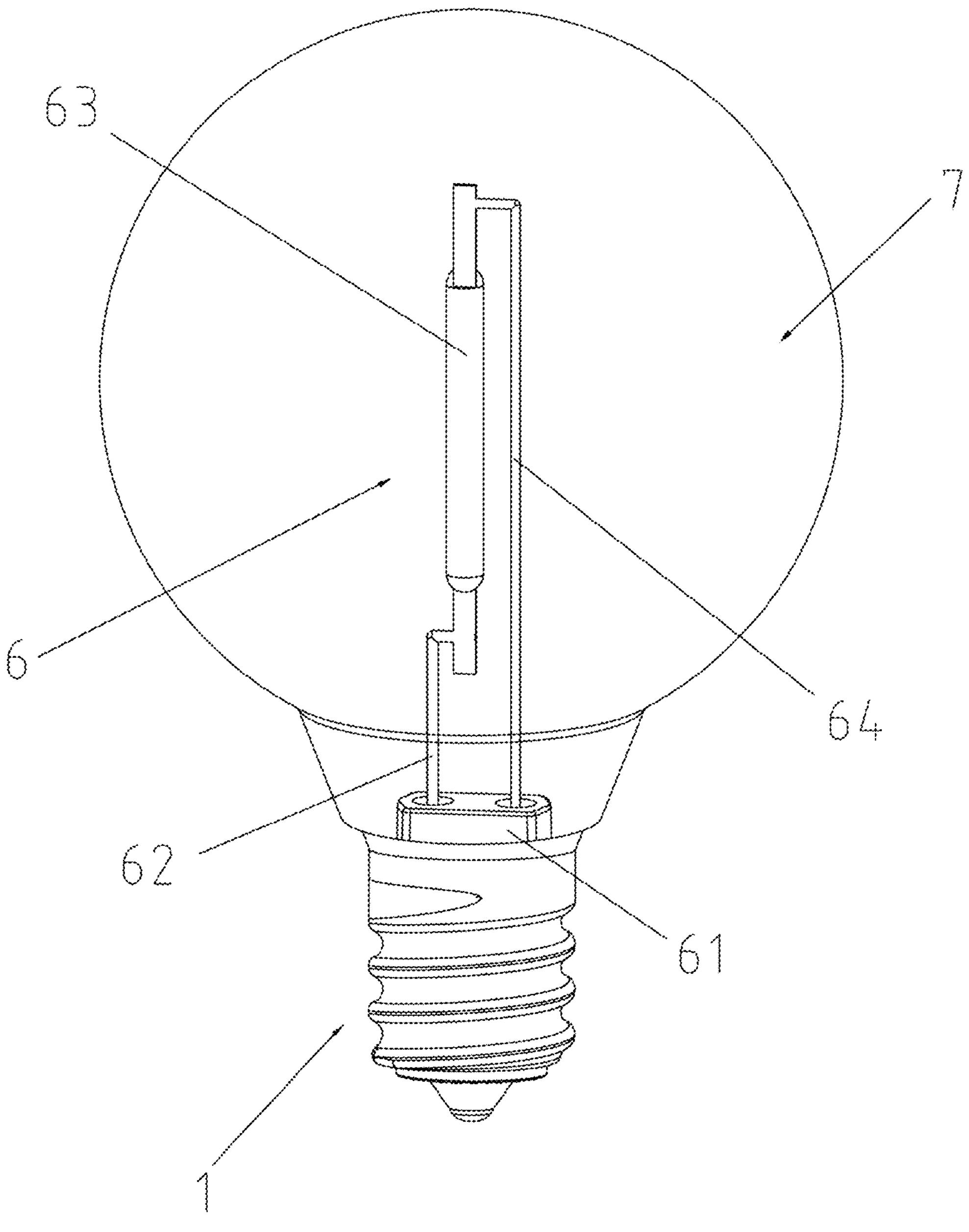
FIG. 1 is a three-dimensional view of a light bulb according to the present disclosure.

Reference numerals include:

1: metal shell; 11: external threaded portion; 12: accommodating cavity; 13: end plate; 131: mounting hole; 14: first annular side wall; 141: internal space; 15: opening; 2: plastic insulating piece; 21: assembling hole; 22: upper assembling portion; 23: lower assembling portion; 24: first annular assembling slot; 25: frustum portion; 3: conductive rivet; 31: rivet cap; 32: rivet body; 33: second annular assembling slot; 34: annular protrusion; 4: accommodating slot; 41: second annular side wall; 5: small space; 6: center column structure; 61: center column seat; 62: first conductor wire; 63: luminescent lamp body; 64: second conductor wire; and 7: bulb shell; X: center line.

DETAILED DESCRIPTION OF THE EMBODIMENTS

The present disclosure will be explained below in conjunction with the accompanying drawings 1 to 10.

Figure 8:
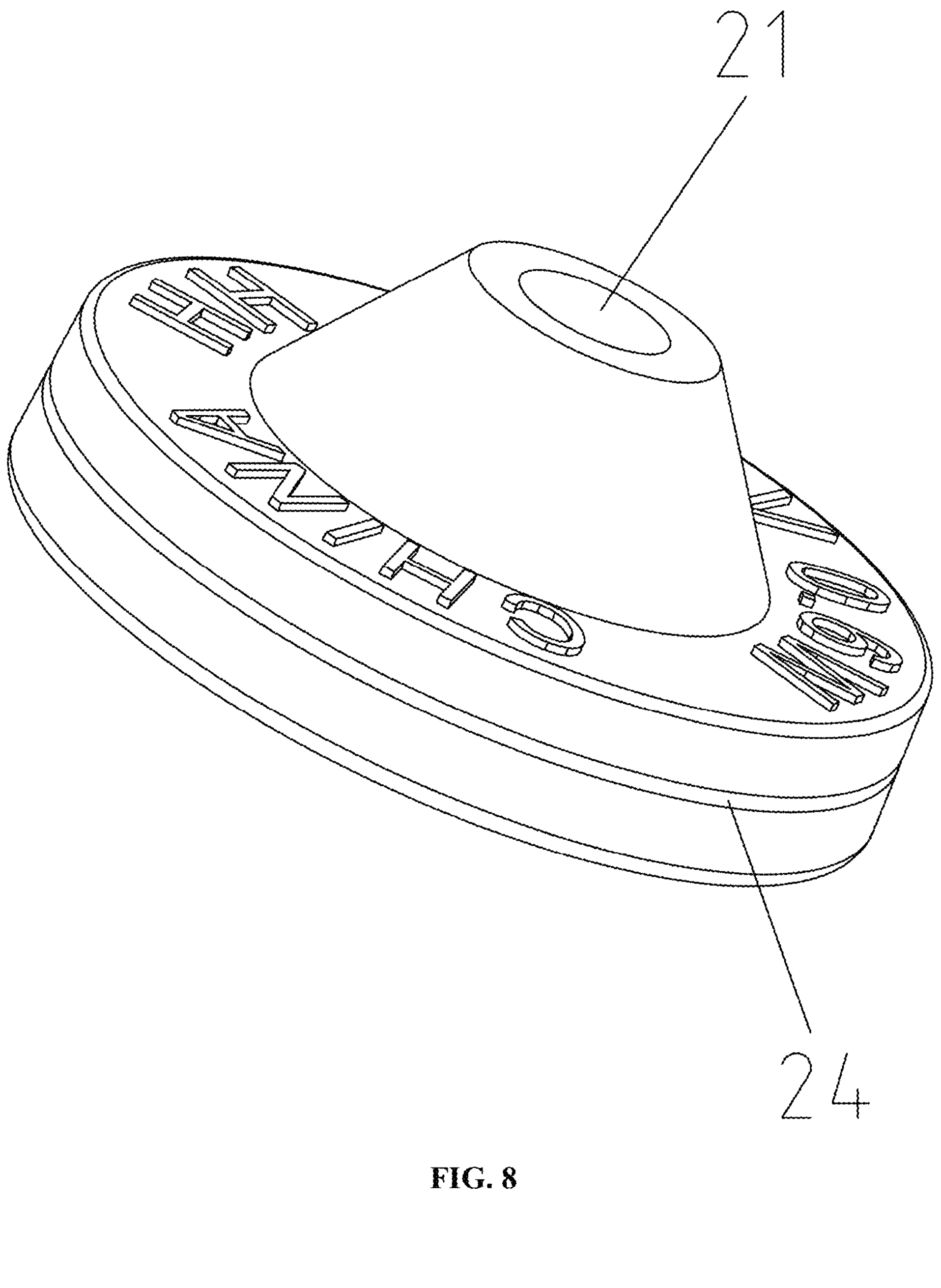
FIG. 8 is a schematic structural diagram of a plastic insulating piece according to the present disclosure.

Referring to FIG. 1 to FIG. 4, the present disclosure discloses a non-welded and anti-deformation lamp base, including a metal shell 1, an end plate 13, a plastic insulating piece 2, and a conductive rivet 3. The the metal shell 1 is provided with an external threaded portion 11, an accommodating cavity 12, and an opening 15. The external threaded portion 1 is provided on an outer surface of the metal shell 1 and convenient for connection to an external lamp holder. The accommodating cavity 12 is provided in an interior of the metal shell 1. The opening 15 is formed at one end of the metal shell 1 and communicates with the accommodating cavity 12. The end plate 13 is arranged at the other end of the metal shell 1. The plastic insulating piece 2 is connected to the end plate 13 and configured to prevent inward sinking deformation of the end plate 13. The plastic insulating piece 2 is located on a center line X of the metal shell 1. As shown in FIG. 8, the plastic insulating piece 2 is provided with an assembling hole 21. The assembling hole 21 communicates with the accommodating cavity 12. The conductive rivet 3 is assembled in the assembling hole 21.

The present disclosure uses the plastic insulating piece 2 to replace a traditional glass insulating layer, and assembles the conductive rivet 3 at a top of the plastic insulating piece 2 for conduction. The conductive rivet 3 replaces a traditional conductive tin layer, so that the lamp base no longer needs to be provided with an impurity glass material and a soldering flux with significant safety hazards. This effectively promotes green and environmentally-friendly production of lamps and can simplify processing steps of lamps. With no tedious tin soldering process, the production cost of lamps is reduced to a certain extent. On the other hand, the plastic insulating piece 2 is used to strengthen the structure of the end plate, improve the stability of the end plate 13, and improve the resistance performance of the end plate 13, so that the lamp head has the function of preventing inward sinking deformation without increasing the production cost.

Figure 9:
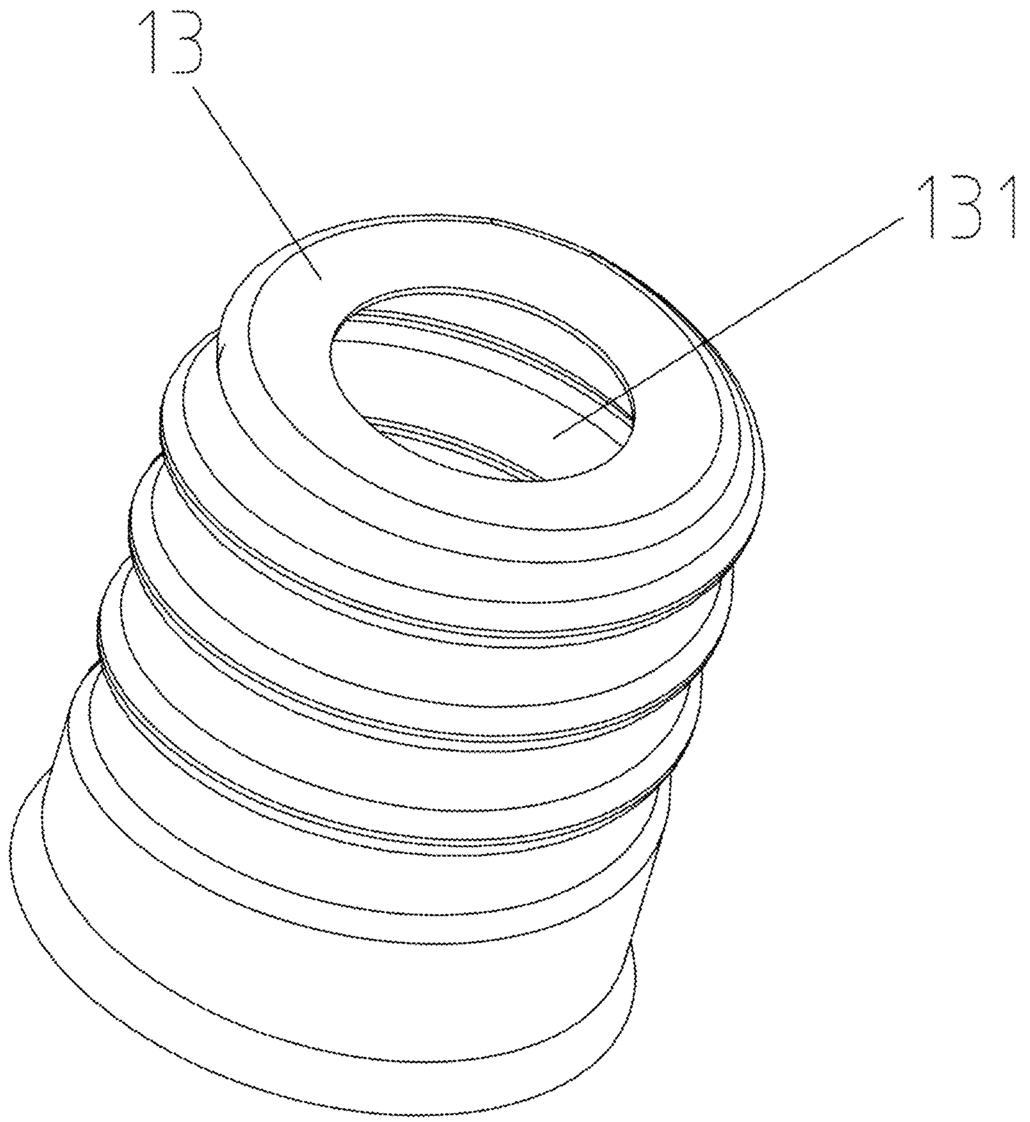
FIG. 9 is a schematic structural diagram of a metal shell according to the present disclosure.

As an embodiment, as shown in FIG. 9, a mounting hole 131 is formed in a middle part of the end plate 13, and the plastic insulating piece 2 is arranged in the mounting hole 131. The plastic insulating piece 2 of this technical solution is formed in a middle position of the end plate 13 by integrated injection molding. After the metal shell 1 has been manufactured, an injection mold extends into the metal shell 1 to perform integrated injection molding to form the plastic insulating piece 2 on the end plate 13. Compared to a process of directly pressing the plastic insulating piece 2 into the top of the metal shell 1 for close assembling, the integrated injection molding process is more concise and can also improve the stability of connection between the plastic insulating piece 2 and the end plate 13, and the plastic insulating piece 2 will not be damaged.

As a preference, the plastic insulating piece 2 includes an upper assembling portion 22 and a lower assembling portion 23 connected to each other; the upper assembling portion 22 is arranged on an inner side of the end plate 13 in an abutting manner; and the lower assembling portion 23 is arranged on an outer side of the end plate 13 in an abutting manner. The upper assembling portion 22 and the lower assembling portion 23 wrap the inner and outer sides of the end plate 13 to improve the anti-deformation performance of the end plate 13. As shown in FIG. 8, a first annular assembling slot 24 is also arranged between the upper assembling portion 22 and the lower assembling portion 23. During the injection molding, the end plate 13 is accommodated in the first annular assembling slot 24.

Figure 5:
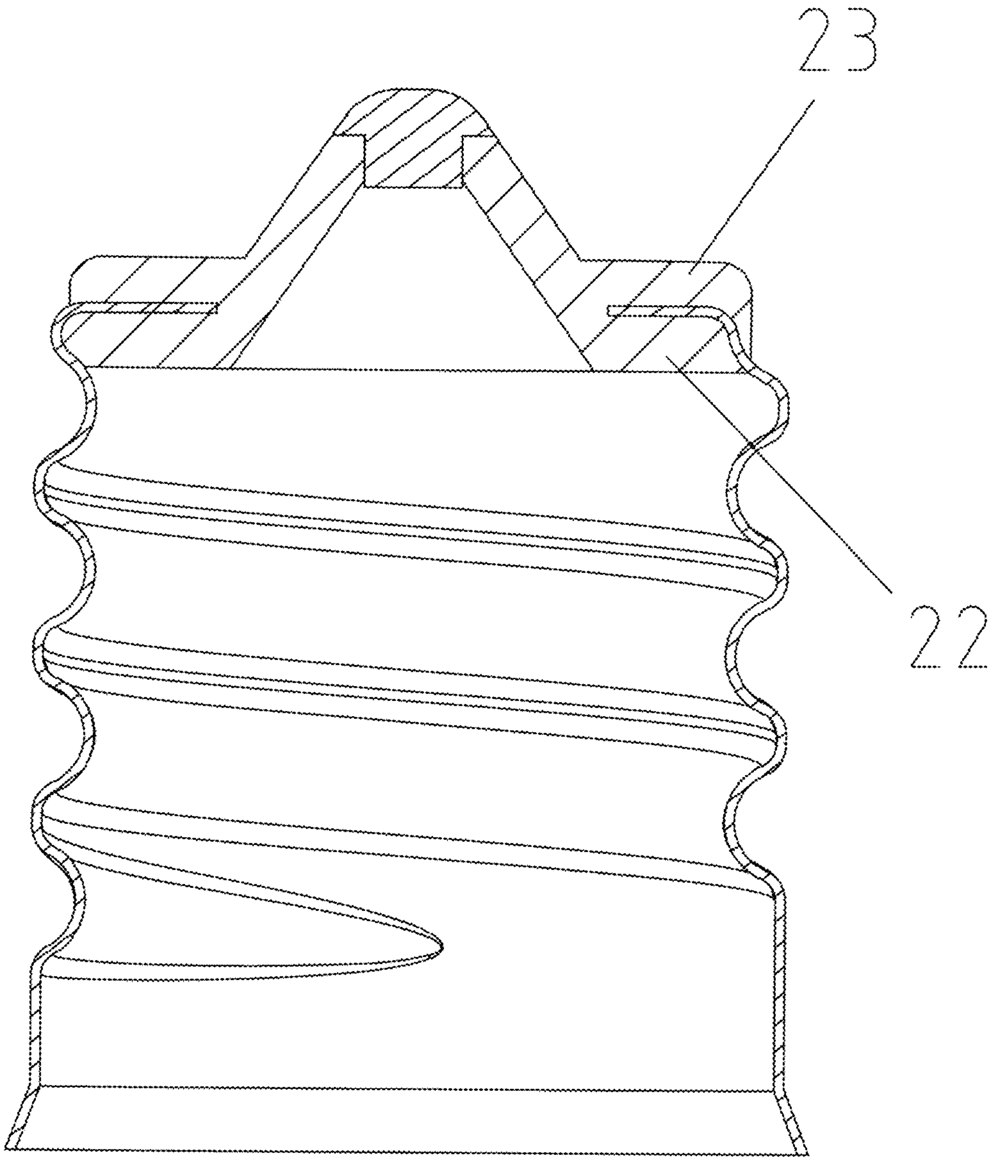
FIG. 5 is a cross-section schematic diagram of an embodiment structure showing that a plastic insulating piece completely covers an end plate according to the present disclosure.

In order to further improve the anti-deformation performance of the lamp base, in an embodiment, as shown in FIG. 5, both the upper assembling portion 22 and the lower assembling portion 23 fully cover an inner surface and an outer surface of the end plate 13, that is, a wrapping area of the upper assembling portion 22 and the lower assembling portion 23 is just at or crosses a boundary of the end plate 13. The plastic insulating piece 2 is formed at a joint between the end plate 13 and a first annular side wall 14 of the metal shell 1, so that the end plate 13 receives a support force of the first annular side wall 14 in the process of assembling the lamp base into the lamp holder, and the anti-deformation performance of the end plate 13 is further improved. In this embodiment, the first annular side wall 14 is arranged on the other end of the metal shell 1 and extends from one end of the external threaded portion 11.

Figure 10:
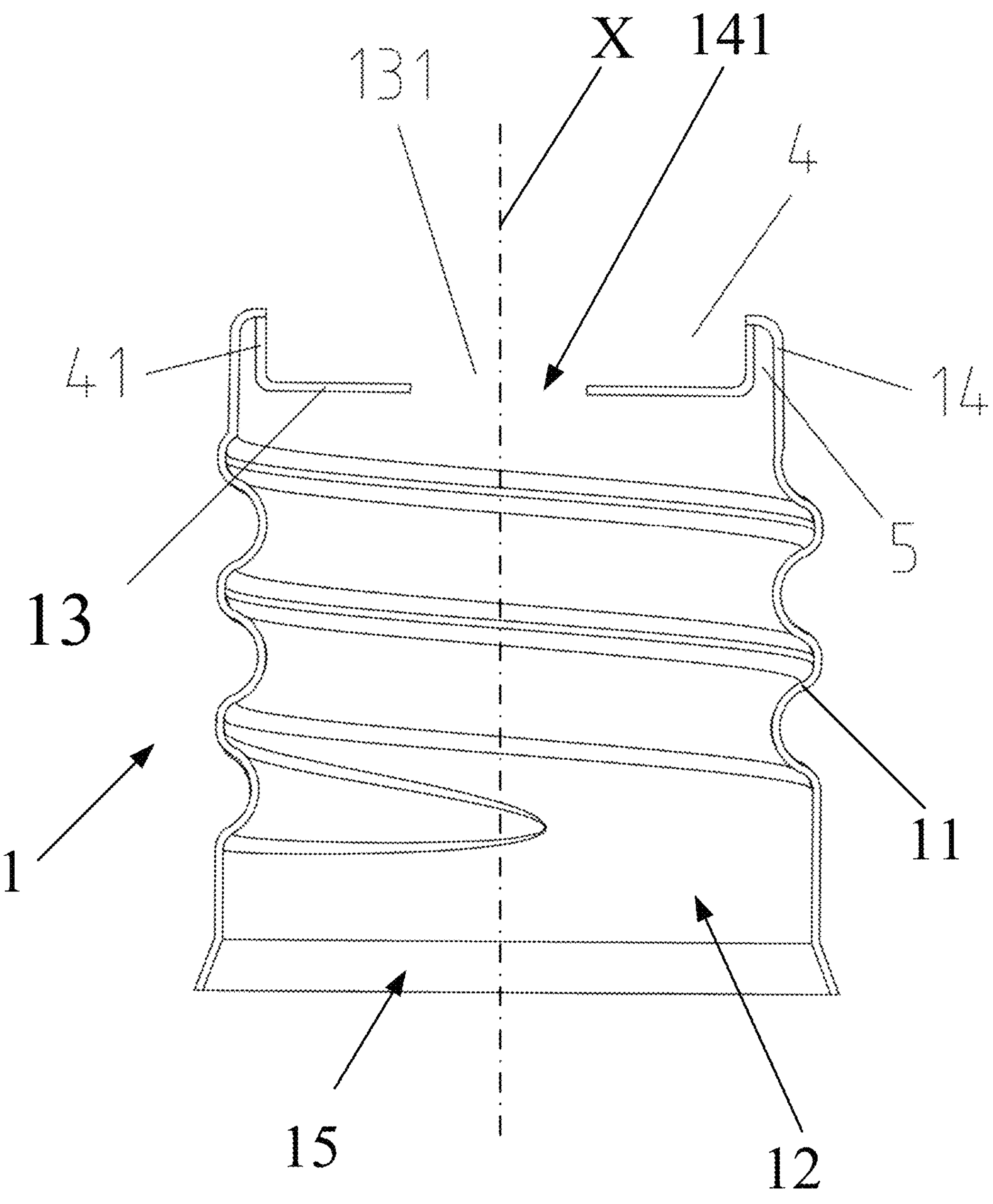
FIG. 10 is cross-section a schematic structural diagram of an accommodating slot according to the present disclosure.

As a preference, in an embodiment, as shown in FIG. 10, an accommodating slot 4 is further formed on the outer side of the end plate 13, and the lower assembling portion 23 is accommodated in the accommodating slot 4. The accommodating slot 4 is formed into an actively inwards sunken design structure. When the lamp base is screwed into the external lamp holder, the accommodating slot 4 increases the structural strength of a bottom of the lamp base to work in conjunction with the upper assembling portion 22 and the lower assembling portion 23, which greatly improves the anti-deformation performance of the lamp base. On the other hand, the accommodating slot 4 can also be configured to accommodate the lower assembling portion 23. The lower assembling portion 23 can partially protrude out of a top of the accommodating slot 4 or exactly have the same height as the accommodating slot 4. When the entire lower assembling portion 23 is accommodated in the accommodating slot 4, the formed lamp base has a more beautiful appearance.

In the technology of the technical solution described above, the accommodating slot 4 can be integrally stamped and formed with the metal shell 1, or can be formed by secondary stamping by the inward sinking of the end plate 13. When the accommodating slot 4 is formed by the inward sinking of the end plate 13, as shown in FIG. 10, the metal shell 1 further includes a second annular side wall 41. The second annular side wall 41 is arranged in an internal space 141 enclosed by the first annular side wall 14, where one end of the second annular side wall is connected to one end of the first annular side wall. The end plate 13 is bent from the other end of the second annular side wall 41 and extends towards the center line X of the metal shell 1. The second annular side wall 41 and the end plate 13 cooperate to form, at an outer side of the end plate 13, the accommodating slot 4 recessing inwards the interior of the metal shell 1. In this embodiment, the second annular side wall 41 and the first annular side wall 14 abut against each other, or, a gap 5 is formed between the second annular side wall 41 and the first annular side wall 14 for preventing inward sinking caused by a force. In this embodiment, the end plate 13 is supported by two walls during the screwed connection to the lamp holder, which improves the anti-deformation performance.

Figure 2:
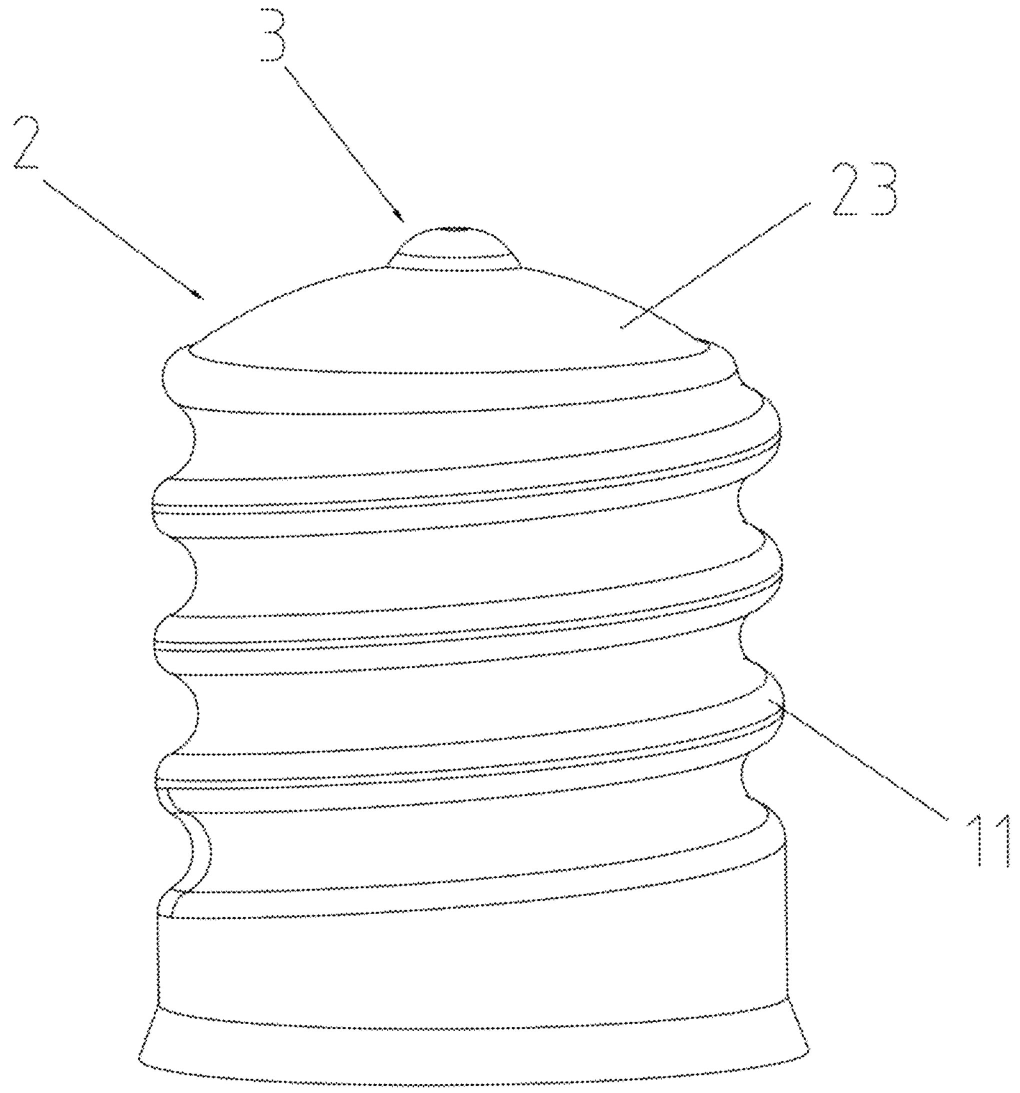
FIG. 2 is a schematic structural diagram of one embodiment of a lower assembling portion according to the present disclosure.

As one embodiment, as shown in FIG. 2, the lower assembling portion 23 can be semi-circular, and the assembling hole 21 is arranged in a middle position of the lower assembling portion 23. The semi-circular lower assembling portion 23 enlarges a stressed area of the plastic insulating piece 2, resulting in an increase in the anti-deformation performance.

Figure 3:
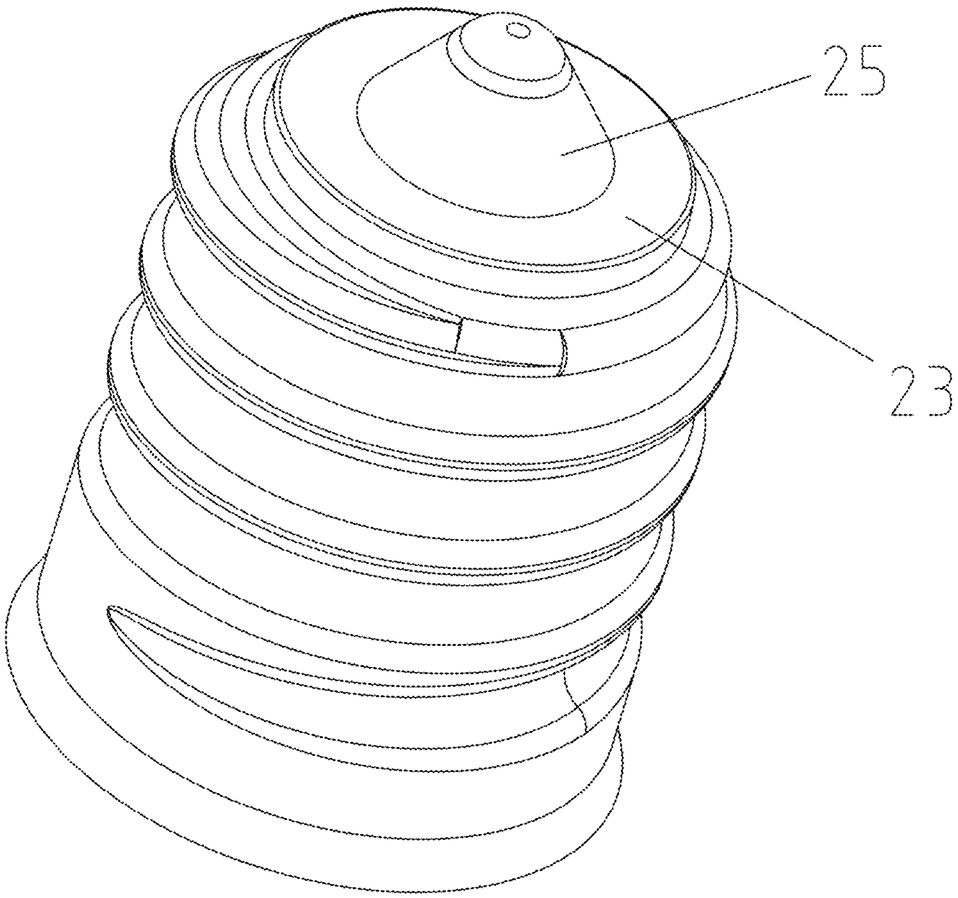
FIG. 3 is a schematic structural diagram of the other embodiment of a lower assembling portion according to the present disclosure.
Figure 4:
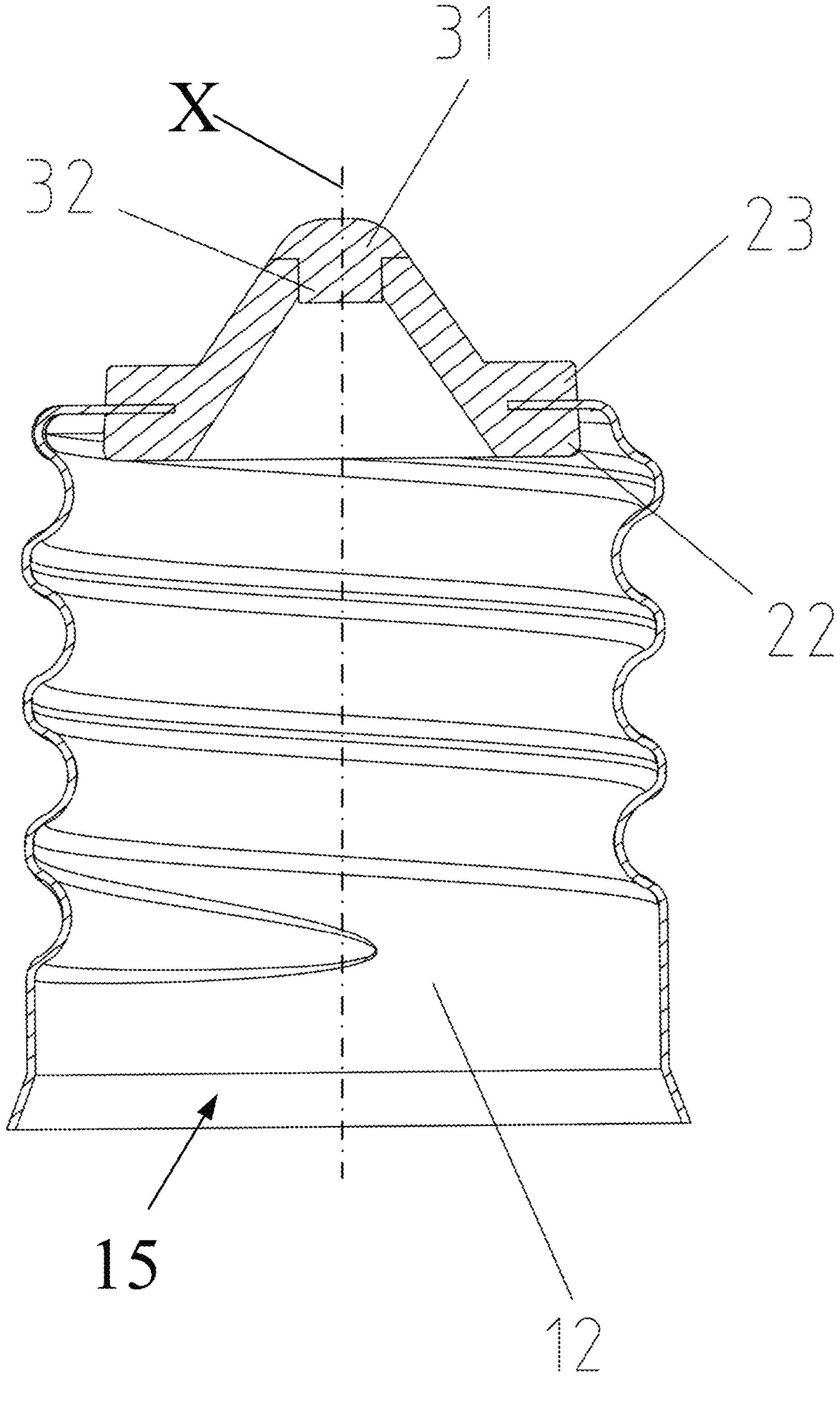
FIG. 4 is a cross-section schematic diagram of a lamp base according to the present disclosure.

In addition to the above embodiment, as another embodiment, as shown in FIG. 3, the plastic insulating piece 2 also includes a frustum portion 25. The frustum portion 25 is connected to the lower assembling portion 23, and the assembling hole 21 is arranged in a middle position of the frustum portion 25. Usually, fixed plates are arranged on two sides of a conductive end inside the lamp holder. In this embodiment, the frustum portion 25 protrudes out of a surface of the lower assembling portion 23, and the frustum portion 25 can avoid the fixed plates inside the lamp holder to facilitate contact between the conductive rivet 3 and the conductive end inside the lamp holder.

Figure 6:
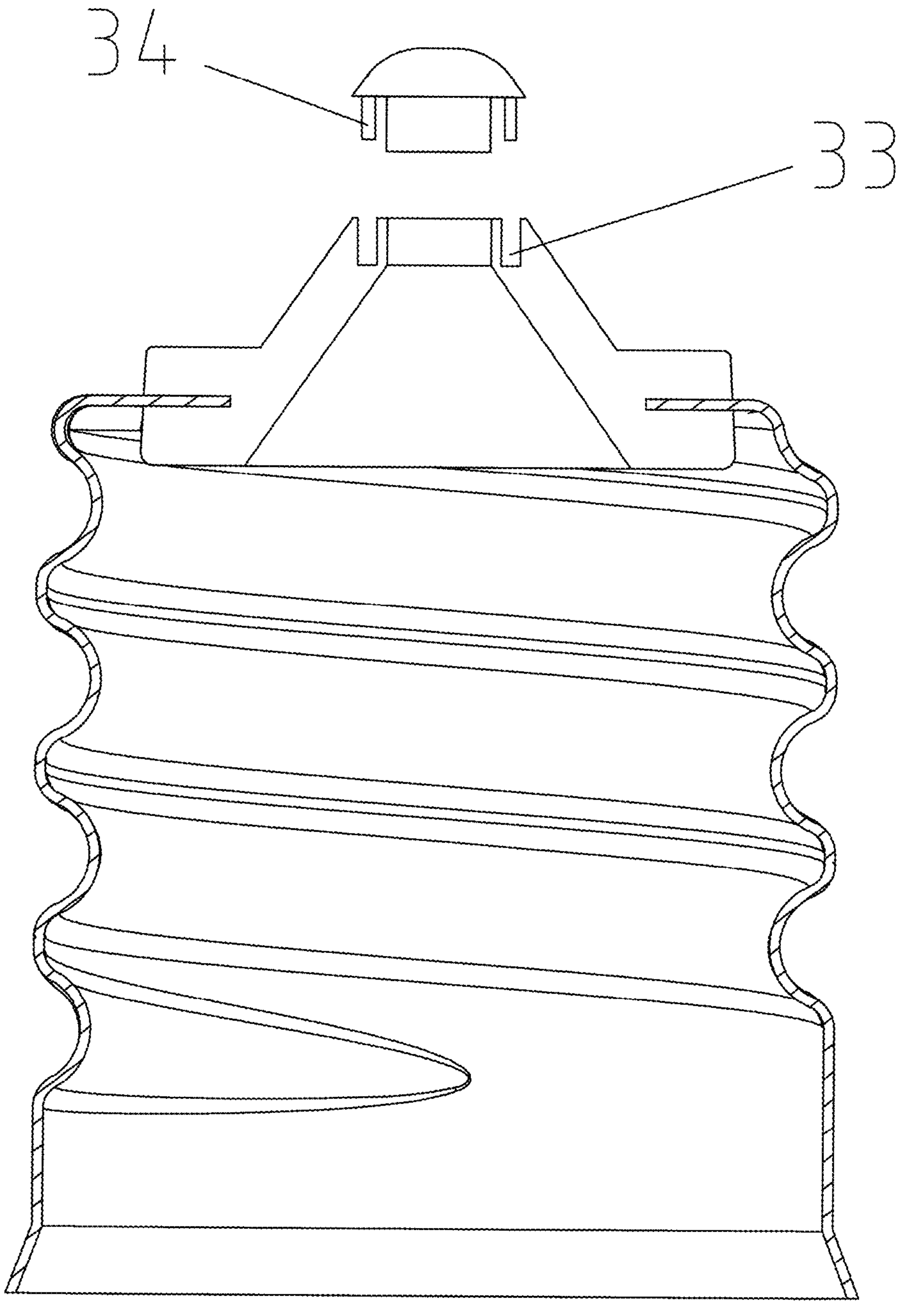
FIG. 6 is a cross-section schematic structural diagram of one embodiment of a conductive rivet according to the present disclosure.
Figure 7:
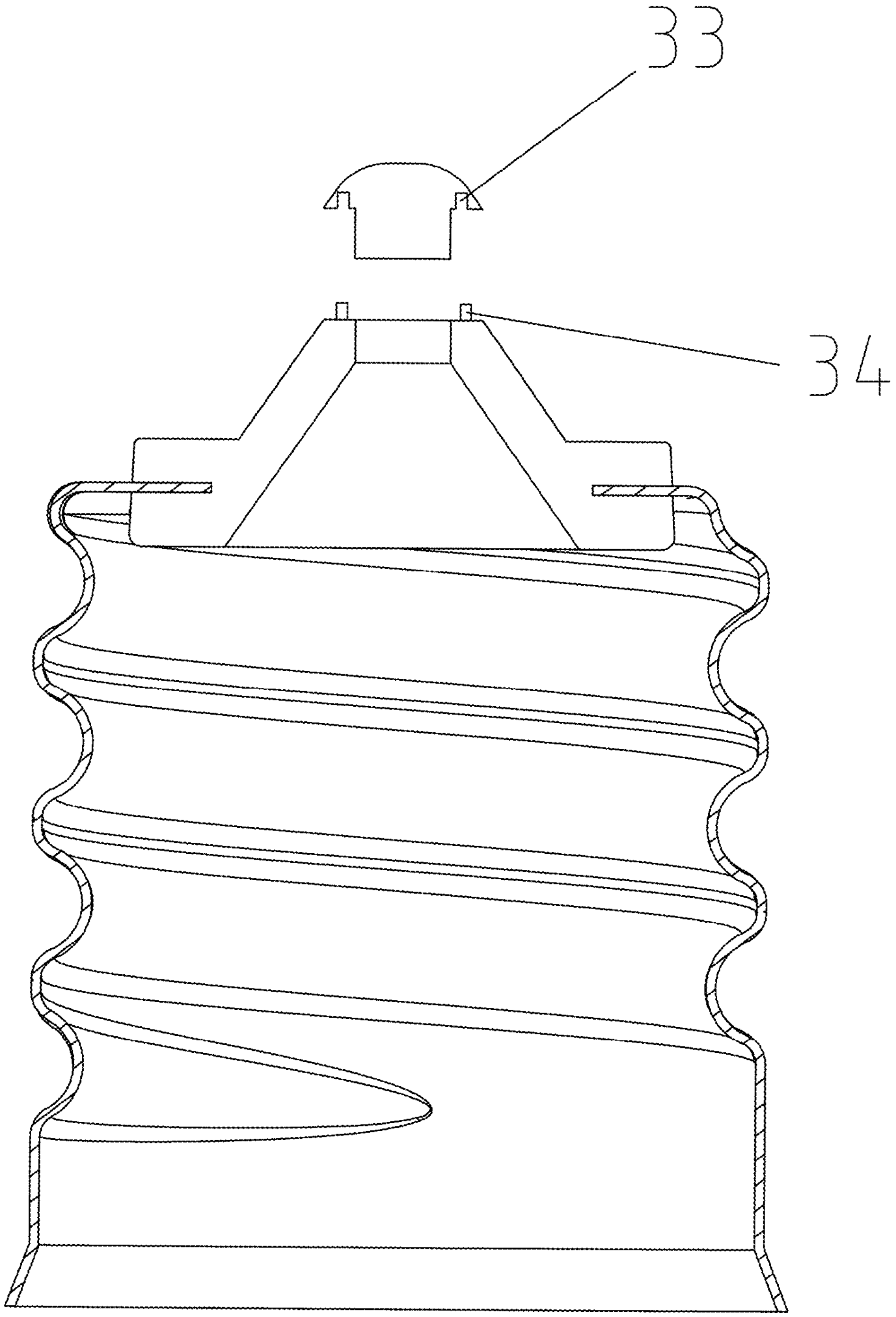
FIG. 7 is a cross-section schematic structural diagram of another embodiment of a conductive rivet according to the present disclosure.

In this technical solution, the conductive rivet 3 includes a rivet cap 31 and a rivet body 32 integrally arranged. In order to improve the firmness of assembling of the conductive rivet 3 and the plastic insulating piece 2 and prevent the conductive rivet 3 from easily falling off, a second annular assembling slot 33 is arranged at an outer end of the assembling hole 21, and an annular protrusion 34 matched with the second annular assembling slot 33 is arranged at a bottom of the rivet cap 31. As shown in FIG. 6, during assembling, the annular protrusion 34 is fixedly inserted into the second annular assembling slot 33. On the contrary, as shown in FIG. 7, an annular protrusion 34 is arranged in the assembling hole 21, and a second annular assembling slot 33 is arranged at a bottom of the rivet cap 31. After the annular protrusion and the second annular assembling slot are assembled, effects of improving the connection strength and preventing the conductive rivet 3 from falling off can also be achieved.

As a preference, the assembling hole 21 is a polygonal hole; the rivet body 32 is polygonal; and the rivet body 32 is matched with the assembling hole 21. To assemble the lamp base, the rivet body 32 is buckled into the polygonal assembling hole 21 for stable assembling. In this embodiment, the polygonal hole and the polygonal rivet body 32 are assembled, which can increase the connection strength, improve the firmness of assembling, and prevent the rivet body 32 from being loosened and falling off.

The present disclosure further provides a non-welded and anti-deformation light bulb. The light bulb includes the non-welded and anti-deformation lamp base described above, a center column structure 6, and a bulb shell 7 fixedly connected to the metal shell 1, wherein the center column structure 6 includes a center column seat 61, and a first conductor wire 62, a luminescent lamp body 63, and a second conductor wire 64 which are electrically connected to each other in sequence; the center column seat 61 is arranged at a mouth portion of the bulb shell 7; the luminescent lamp body 63 is arranged inside the bulb shell 7; one end of the first conductor wire 62 and one end of the second conductor wire 64 are respectively electrically connected to the luminescent lamp body 63 through the center column seat 61; the other end of the first conductor wire 62 is electrically connected to the metal shell 1; and the other end of the second conductor wire 64 is electrically connected to the conductive rivet 3. The light bulb of the present disclosure is simple in structure. Compared to the traditional light bulb, the light bulb of the present disclosure has a deformation prevention function, higher quality, and lower manufacturing cost.

The above content only describes preferred embodiments of the present disclosure. A person of ordinary skill in the art can make changes to specific implementations and the application scope according to the idea of the present disclosure. The content of this specification should not be understood as a limitation on the present disclosure.

What is claimed is:

1. A non-welded and anti-deformation lamp base, comprising:

a metal shell (1), wherein the metal shell (1) is provided with:

an external threaded portion (11) on an outer surface of the metal shell (1);

an accommodating cavity (12) in an interior of the metal shell (1);

an opening (15) formed at one end of the metal shell (1) and communicating with the accommodating cavity (12);

a first annular side wall (14) arranged on the other end of the metal shell (1) and extending from one end of the external threaded portion (11); and a second annular side wall (41) arranged in an internal space (141) enclosed by the first annular side wall (14); wherein one end of the second annular side wall (41) is connected to one end of the first annular side wall (14);

an end plate (13) arranged at the other end of the metal shell (1); wherein the end plate (13) is bent from the other end of the second annular side wall (41) and extends towards a center line (X) of the metal shell (1); wherein the second annular side wall (41) and the end plate (13) cooperate to form, at an outer side of the end plate (13), an accommodating slot (4) recessing inwards toward the interior of the metal shell (1);

a plastic insulating piece (2) connected to the end plate (13) and configured to prevent inward sinking deformation of the end plate (13); wherein the plastic insulating piece (2) is located on the center line of the metal shell (1); the plastic insulating piece (2) is provided with an assembling hole (21); the assembling hole (21) communicates with the accommodating cavity (12); and a conductive rivet (3), wherein the conductive rivet (3) is assembled in the assembling hole (21).

2. The non-welded and anti-deformation lamp base according to claim 1, wherein a mounting hole (131) is formed in a middle part of the end plate (13); the plastic insulating piece (2) is arranged in the mounting hole (131); the plastic insulating piece (2) comprises an upper assembling portion (22) and a lower assembling portion (23) connected to each other; the upper assembling portion (22) is arranged on an inner side of the end plate (13); the lower assembling portion (23) is arranged on an outer side of the end plate (13) and accommodated in the accommodating slot (4); and a first annular assembling slot (24) configured to be connected to the end plate (13) is arranged between the upper assembling portion (22) and the lower assembling portion (23).

3. The non-welded and anti-deformation lamp base according to claim 2, wherein both the upper assembling portion (22) and the lower assembling portion (23) fully cover an inner surface and an outer surface of the end plate (13).

4. The non-welded and anti-deformation lamp base according to claim 2, wherein the second annular side wall (41) abuts against the first annular side wall (14), or, a space (5) is formed between the first annular side wall (14) and the second annular side wall (41).

5. The non-welded and anti-deformation lamp base according to claim 2, wherein a cross section of the lower assembling portion (23) is semi-circular, and the assembling hole (21) is arranged in a middle position of the lower assembling portion (23).

6. The non-welded and anti-deformation lamp base according to claim 2, wherein the plastic insulating piece (2) further comprises a frustum portion (25); the frustum portion (25) is connected to the lower assembling portion (23); and the assembling hole (21) is arranged in a middle position of the frustum portion (25).

7. The non-welded and anti-deformation lamp base according to claim 1, wherein the conductive rivet (3) comprises a rivet cap (31) and a rivet body (32) integrally arranged; wherein the rivet body (32) is matched with the assembling hole (21);

a second annular assembling slot (33) is arranged at an outer end of the assembling hole (21), and an annular protrusion (34) matched with the second annular assembling slot (33) is arranged at a bottom of the rivet cap (31); or, an annular protrusion (34) is arranged at an outer end of the assembling hole (21), and a second annular assembling slot (33) matched with the annular protrusion (34) is arranged at a bottom of the rivet cap (31).

8. A non-welded and anti-deformation light bulb, comprising:

the lamp base according to claim 1;

a bulb shell (7) fixedly connected to the metal shell (1); and a center column structure (6), wherein the center column structure (6) comprises:

a center column seat (61) arranged at a mouth portion of the bulb shell (7); and a first conductor wire (62), a luminescent lamp body (63), and a second conductor wire (64) which are electrically connected to each other in sequence; wherein the luminescent lamp body (63) is arranged inside the bulb shell (7); one end of the first conductor wire (62) and one end of the second conductor wire (64) are respectively electrically connected to the luminescent lamp body (63) through the center column seat (61); the other end of the first conductor wire (62) is electrically connected to the metal shell (1); and the other end of the second conductor wire (64) is electrically connected to the conductive rivet (3).

* * * * *